United States Patent [19]

Cadeé

[11] Patent Number: 4,500,301
[45] Date of Patent: Feb. 19, 1985

[54] APPARATUS FOR CONTROLLING THE TRANSMISSION RATIO OF AN INFINITELY VARIABLE TRANSMISSION

[75] Inventor: Theodorus P. M. Cadeé, Goirle, Netherlands

[73] Assignee: Van Doorne's Transmissie B.V., Tilburg, Netherlands

[21] Appl. No.: 432,857

[22] Filed: Oct. 5, 1982

[30] Foreign Application Priority Data

Oct. 5, 1981 [NL] Netherlands .................. 8104510

[51] Int. Cl.³ .............................................. F16H 11/04
[52] U.S. Cl. .................................. 474/28; 137/625.61
[58] Field of Search ...................... 474/28, 18; 251/30, 251/138; 137/625.61

[56] References Cited

U.S. PATENT DOCUMENTS

| | | | |
|---|---|---|---|
| 2,896,588 | 7/1959 | Hayner et al. | 137/625.61 |
| 2,972,467 | 2/1961 | Gilman | 251/138 |
| 3,918,312 | 11/1975 | Espenschied et al. | 474/18 X |
| 4,369,675 | 1/1983 | Van Deursen | 474/28 X |
| 4,387,608 | 6/1983 | Mohl et al. | 474/18 X |

Primary Examiner—Stephen J. Novosad
Assistant Examiner—Thuy M. Bui
Attorney, Agent, or Firm—Cushman, Darby & Cushman

[57] ABSTRACT

In apparatus for controlling the transmission ratio of an infinitely variable V-belt transmission of the kind including a fluid control valve which supplies fluid to and relieves fluid from a cylinder space the volume of which controls the transmission ratio by adjusting the axial position of a first conical sheave portion relative to a second conical sheave portion, the valve including a valve housing and an internal axially displaceable valve body, the improvement which includes an electromagnet having a displaceable armature and a winding which upon electrical energization produces a displacing force on the armature; a spring connected between the armature and the axially displaceable valve body, the arrangement being such that a displacing force on the armature produced by energization of the electromagnet produces a displacing force, via the spring on the valve body in a first direction; and a fluid connection device controlled by the position of the armature for supplying fluid pressure to the valve body to effect a displacing force thereon in a direction opposite to the first direction such that the valve body is displaced in such opposite direction to a position in which the displacing forces on the valve body are balanced.

3 Claims, 4 Drawing Figures

4,500,301

APPARATUS FOR CONTROLLING THE TRANSMISSION RATIO OF AN INFINITELY VARIABLE TRANSMISSION

This invention relates to fluid pressure control valve assemblies for controlling the transmission ratio of an infinitely variable V-belt transmission.

BACKGROUND

It is known to control an infinitely variable V-belt transmission with a fluid control valve assembly which supplies fluid to and relieves fluid from a cylinder space the volume of which controls the transmission ratio by adjusting the axial position of a first conical sheave portion relative to a second conical sheave portion. The control valve assembly includes a valve housing and an internal, displaceable valve body. Such control apparatus is known from U.S. Pat. No. 4,152,947 where, depending on a spring load and a fluid pressure, a fluid flow is conducted to the operating cylinder of the variable V-belt transmission, because the valve body upon axial displacement closes or opens passages. In this known design the spring load is regulated by mechanical means and by a fluid pressure which is governed by the input speed of the V-belt transmission.

The operation of the control valve by means of mechanical signals limits the adjustability of the control valve, because such mechanical signals generally allow of only limited variation.

SUMMARY OF THE INVENTION

The present invention has for its object to provide a control valve for regulation of a fluid flow of such design that the displaceable valve body of the control valve can be accurately adjusted at the command of an electric signal.

According to the invention, this is achieved by connecting the valve body by spring means to the armature of an electromagnet, the arrangement being such that the armature upon a slight displacement regulates a fluid pressure which imposes a load or displacing force on the valve body. A change in the degree of energizing of the electromagnet will cause a displacement of the armature, as a result of which the fluid pressure acting upon the valve body is adjusted. The equilibrium will be restored because the valve body acts upon the armature through the spring means, the valve body assuming a modified position. The action will be elucidated further by reference to the drawings.

According to a further feature of the invention, the spring means may have the form of a helical spring mounted between the valve body and the axially displaceable armature. The armature forms a variable restriction in a fluid passage upon a slight displacement. Such helical spring may have a linear or non-linear or any other characteristic. Its shape may be cylindrical, conical or the like.

In consequence, there are actually two bodies present, connected by a helical spring, of which the armature acting as a valve body is displaced only slightly, so that upon a change in length of the helical spring the valve body is displaced virtually in proportion. The change in length of the helical spring is induced by a variation in the hydraulic load on the valve body, and this variation is in its turn due to a change of the variable restriction attending a change in the electromagnetic load on the armature.

Also according to a feature of the invention, the valve body may be hydraulically loaded by fluid pressure at the side of the valve body facing away from the helical spring, the fluid pressure being controlled by the supply of fluid through the variable restriction and by the discharge of fluid through another restriction.

According to still another feature of the invention, the armature may, upon a slight displacement, control fluid pressure in a space present between the valve body and the armature, the latter being provided with an axial bore, so that the fluid pressure is present on both sides of the armature and therefore imposes little or no load on the armature. To limit the fluid flow through said space, the fluid supply to said space as well as the fluid discharge from said space can be throttled.

Figure 1:
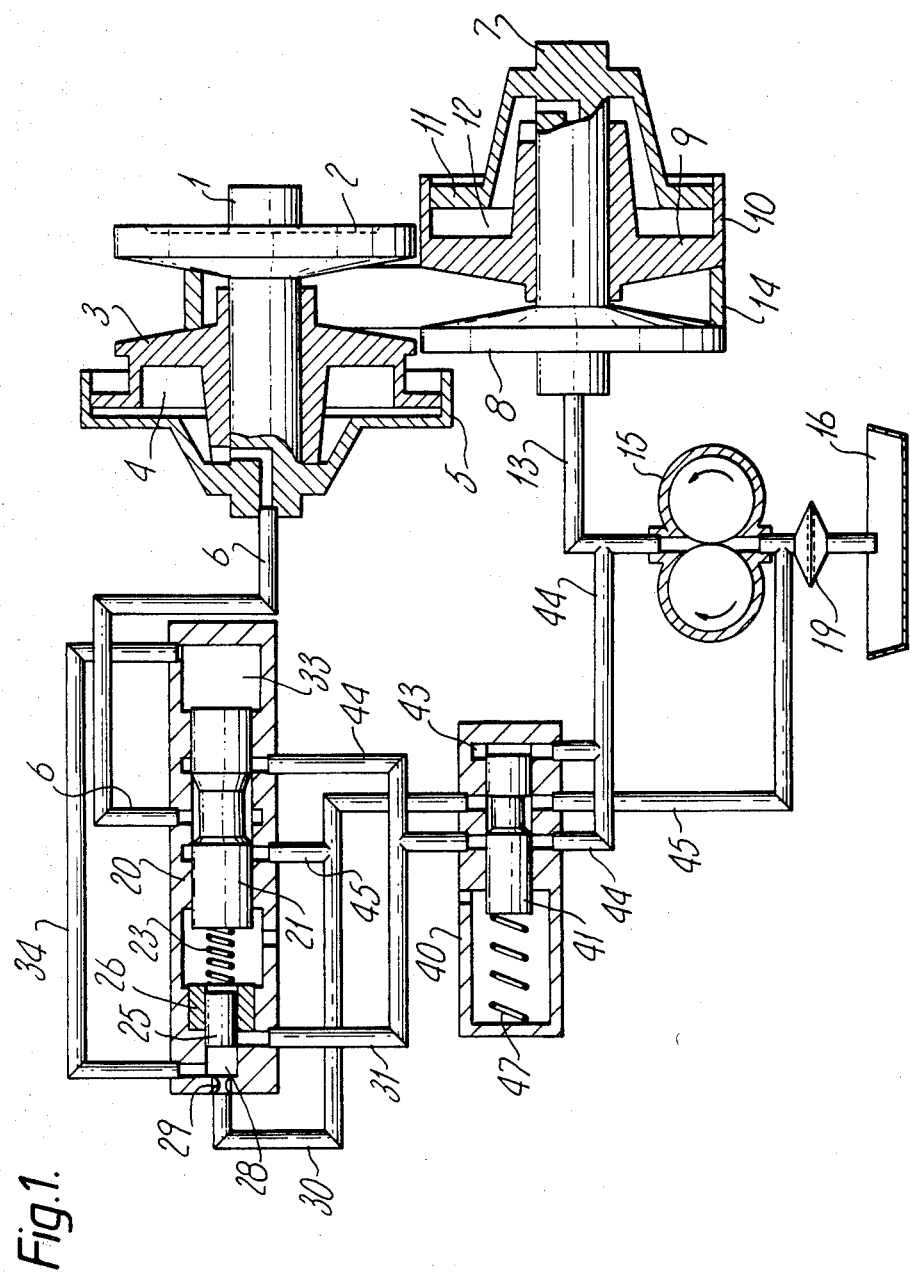
FIG. 1 is a schematic illustration of an infinitely variable transmission having a control system embodying the principles of the present invention.

The V-belt transmission is provided with a primary or input shaft 1 carrying a fixed conical sheave portion 2 and an axially movable conical sheave portion 3. Sheave portions 2 and 3 together form the primary pulley. Sheave portion 3 also forms the piston of a primary operating cylinder 5 enclosing a cylinder space 4. The supply of hydraulic fluid to the cylinder space 4 takes place via a fluid line 6.

The V-belt transmission is also provided with a secondary or output shaft 7 carrying a fixed conical sheave portion 8 and an axially movable conical sheave portion 9. Sheave portions 8 and 9 together form the secondary pulley of the V-belt transmission. Sheave portion 9 is integrally connected to a cylinder 10, which accommodates a piston 11 rigidly fixed to the secondary shaft 7 so as to enclose a cylinder space 12. The supply of fluid to the cylinder space 12 takes place via a fluid line 13.

Through axial displacement of the conical sheave portions 3 and 9, the running radius of a drive belt 14 looped over the primary and the secondary pulleys can be changed such that the difference in rotation speed between the input shaft 1 and the output shaft 7 is infinitely variable.

The transmission is also provided with a fluid pump 15 for the supply of fluid from a reservoir 16 through a filter 19.

The pressure of the fluid delivered by the fluid pump 15 is controlled by means of an overflow valve 40. This valve 40 is provided with a displaceable valve body 41 which is loaded on one end by a helical spring 47 and on the other end by the fluid pressure in a space 43. At sufficiently high pressure in the space 43, hence also in a line 44, the valve body 41 will move sufficiently to the left that fluid may flow away from the line 44 through a line 45 to the reservoir 16. In this fashion the pressure in line 44, line 13 and cylinder space 12 is limited.

The transmission ratio of the V-belt transmission is controlled by means of a control valve 20, which includes a valve housing and an internal axially displaceable valve body 21, the valve either supplying fluid to the cylinder space 4 via line 6 or discharging fluid from the cylinder space 4. To this end, either lines 44 and 6 or lines 45 and 6 are interconnected through displacement of the valve body 21.

As the effective diameter of the cylinder space 4 exceeds that of the cylinder space 12, the transmission will shift up to a higher gear (larger running radius in the primary pulley 2, 3) at equal fluid pressure in both cylinder spaces 4 and 12 (upon displacement of valve body 21 to the right).

According to FIG. 1, the valve body 21 is connected through a helical spring 23 to an armature 25, on which a force directed to the right can be exerted by means of electromagnet 26. The armature 25 is also designed to act as a valve body for the, at least partial, closure of fluid supply line 31. Upon a slight displacement of the armature 25, the supply of fluid from line 31 to space 28 is throttled. As the discharge of fluid from space 28 to line 30 passes through restriction 29, a fluid pressure depending on the position of armature 25 is built up in space 28. The same fluid pressure is present in space 33 which communicates with space 28 via a line 34.

It will be clear that the length of spring 23 is directly dependent on the fluid pressure in spaces 28 and 33. As the armature 25 is only slightly displaced in the process of controlling the pressure in spaces 28 and 33, it will be substantially the valve body 21 which moves. Since the cross-sectional area of the valve body 21 is larger than that of the armature 25, the fluid pressure in spaces 28 and 33 will result in a force to the left on armature 25, which force will be in balance with the force exerted by electromagnet 26 on armature 25.

The mode of operation of valve 20 according to FIG. 1 is as follows. When the electromagnet 26 is energized to a certain degree, the armature 25 will assume such a position that the said resultant force to the left (induced by the fluid pressure in spaces 28 and 33) is at equilibrium with respect to the force to the right exerted by the electromagnet 26 on the armature 25.

If the degree of energizing of the electromagnet 26 is increased, armature 25 will move slightly to the right, owing to which the fluid supply from line 31 increases and, in consequence, the pressure in spaces 28 and 33 also increases. As a result, the resultant force to the left is enhanced, causing spring 23 to be compressed and valve body 21 to move to the left. A modified state of equilibrium is thereby created.

It is evident therefore that the degree of energizing of the electromagnet 26 governs the position of the valve body 21 and can thereby bring about controlled supply of fluid to or discharge of fluid from the operating cylinder 4.

Figure 2:
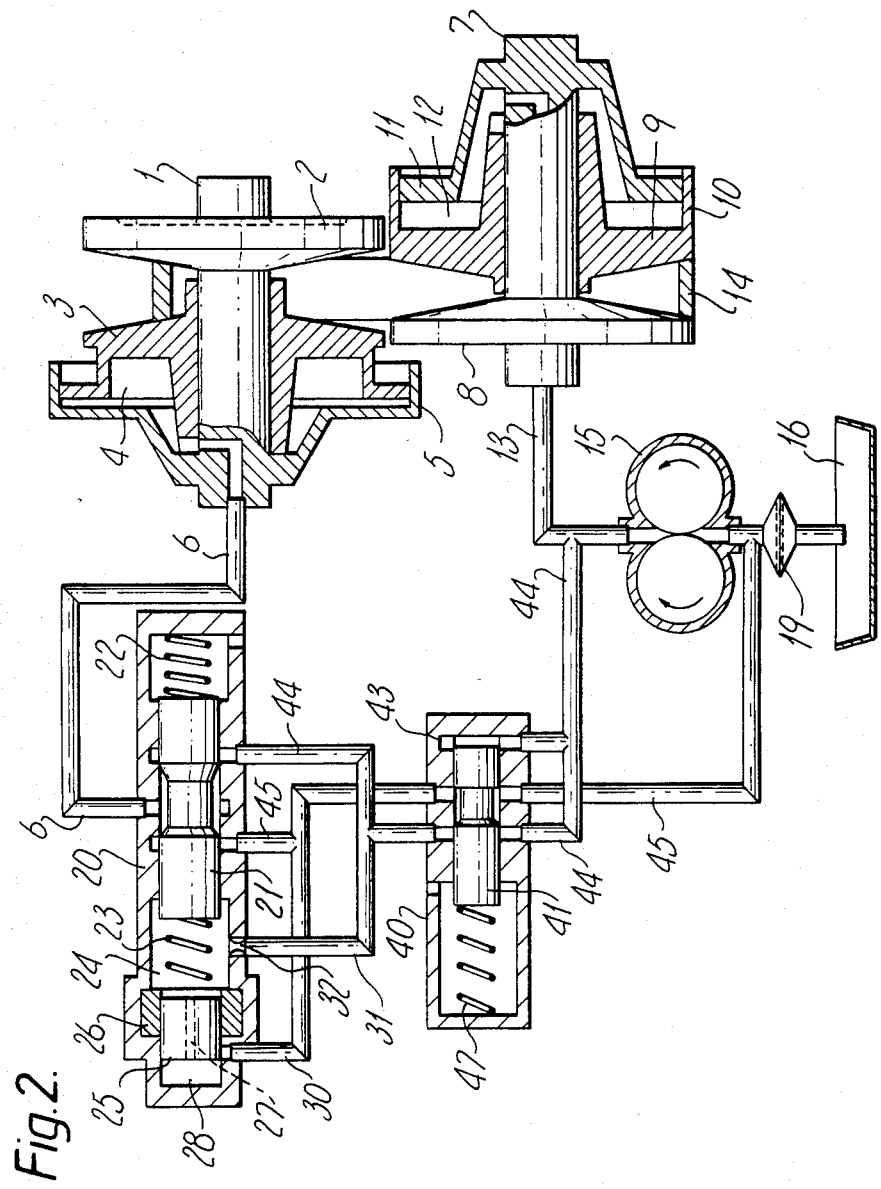
FIGS. 2, 3 and 4 are schematic views similar to FIG. 1 illustrating second, third and fourth embodiments, respectively, of control systems.

In the embodiment according to FIG. 2 the armature 25 is provided with an axial bore 27, so that the spaces 28 and 24 are connected together. Fluid is supplied to space 24 through line 31 via a restriction 32. Depending on the position of armature 25, fluid is discharged through line 30, so the fluid pressure in spaces 28 and 24 is controlled by a slight displacement of armature 25. In addition, the valve body 21 is under load from the helical spring 22.

From FIG. 2 it will be clear that at any degree of energizing of the electromagnet 26 the valve body 21 assumes such a position that the force of the spring 22 is at equilibrium with respect to the force of the spring 23 augmented by the force which the fluid pressure in space 24 exerts on the valve body 21. At a higher degree of energizing of electromagnet 26 the armature 25 will move slightly to the right, causing the pressure in space 24 to drop (the fluid being discharged through line 30). As a result, the valve body 21 moves to the left and thereby compresses helical spring 23, so that the force which the electromagnet 26 exerts on the armature 25 is again in balance with the force of spring 23. (The fluid pressure has no effect on armature 25, being equal on both sides.)

Just as in the embodiment according to FIG. 1, therefore, in the embodiment of FIG. 2 an increase in the energizing of electromagnet 26 induces a displacement of valve body 21 to the left.

Figure 3:
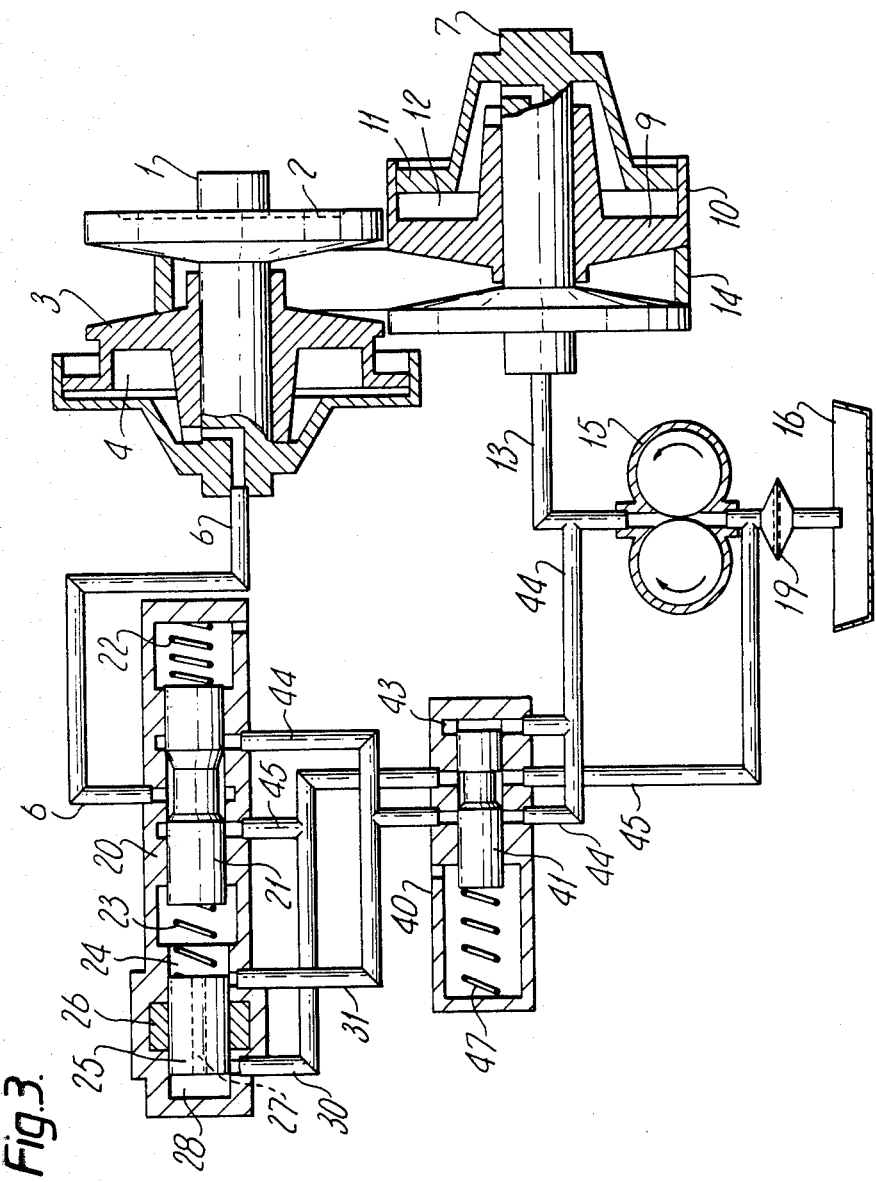

FIG. 3 shows a similar embodiment as presented in FIG. 2. However, there is no fixed restriction in fluid line 31. According to the embodiment of FIG. 3 not only the supply of fluid through fluid line 30 is variably throttled by armature 25, but also the discharge of fluid through fluid line 31 is variably throttled by armature 25. In principle the functioning of the embodiments of FIGS. 2 and 3 are equal.

Figure 4:
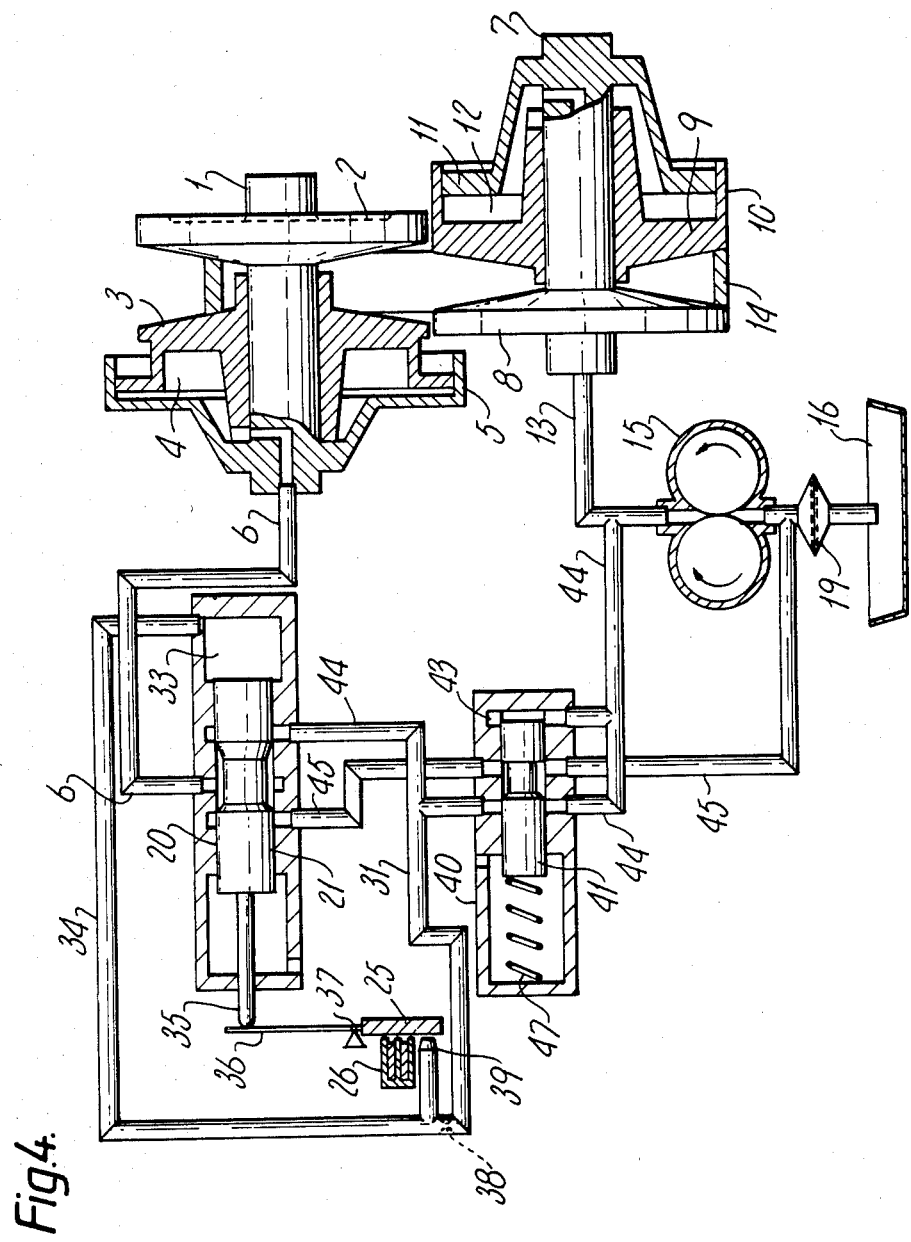

FIG. 4 shows an embodiment in which the valve body 21 is provided with a rod 35 having an end resting against a leaf spring 36. The leaf spring 36 will deflect depending on the force which the rod 35 exerts on it. The fluid supply line 31 is provided with a restriction 38 and a nozzle or orifice 39 which is closed at least partly by the armature 25 of electromagnet 26. The armature can turn on hinge point 37 and is rigidly connected to the leaf spring 36, which can therefore also turn on hinge point 37.

It will be clear that a slight displacement of armature 25 relative to the orifice 39 enables regulation of a fluid pressure which is passed on through line 34 to space 33.

From FIG. 4 it will be readily apparent that at a certain degree of energizing of the electromagnet 26 the fluid pressure in space 33 increases and that, in consequence, the valve body 21 moves to the left until the leaf spring 36 has been deflected to such an extent that armature 25 starts moving to the right, against the force of electromagnet 26. The orifice 39 is thereby partly released, so that a state of equilibrium sets in with valve body 21 assuming a certain position. When the degree of energizing of electromagnet 26 is stepped up, a new equilibrium will be created, with the valve body 21 displaced to the left by the increase of fluid pressure in space 33. The leaf spring 36 is then deflected further and the greater force thereby exerted on the armature 25 is at equilibrium with respect to the force of the electromagnet. Also owing to a slight displacement of the armature 25 the orifice 39 is closed up somewhat more.

The invention is not confined to the embodiments here described. It will be clear that the invention can be embodied in many variations and derivative constructions.

What is claimed is:

1. An apparatus for controlling the transmission ratio of an infinitely variable V-belt transmission of the kind including a fluid control valve which supplies fluid to and relieves fluid from a cylinder space the volume of which controls the transmission ratio by adjusting the axial position of a first conical sheave portion relative to a second conical sheave portion, said valve including a valve housing, an internal axially displaceable valve body an electromagnet having a displaceable armature, the electromagnet upon electrical energization producing an axial force on the armature, and spring means connected between the armature and said axially displaceable valve body, the arrangement being such that the axial force on the armature produced by energization of the electromagnet produces a displacing force, via said spring means, on said valve body in one direction; and fluid connection means controlled by the position of the armature for supplying fluid pressure to said valve body to effect a displacing force thereon in a direction opposite to said one direction such that said valve body is displaced in said opposite direction to a position in which the displacing forces on said valve body are balanced.

2. An apparatus for controlling the transmission ratio of an infinitely variable V-belt transmission of the kind including a fluid control valve which supplies fluid to and relieves fluid from a cylinder space the volume of which controls the transmission ratio by adjusting the axial position of a first conical sheave portion relative to a second conical sheave portion, said valve including a valve housing, an internal axially displaceable valve body, an electromagnet having an axially displaceable armature, the electromagnet upon electrical energization producing an axial force on the armature, first spring means connected between the armature and the one side of said axially displaceable valve body and second spring means for loading the said valve body on the other side, and a hydraulic space extending on both sides of the armature and said one side of the valve body, the fluid pressure in said hydraulic space being controlled by the position of the armature to effect a displacing force on said one side of the valve body such that said valve body is displaced to a position in which the displacing forces on said valve body by the first spring means, second spring means and the said fluid pressure are balanced.

3. An apparatus as in claim 2 wherein a supply line for fluid supply to the hydraulic space and a discharge line for fluid discharge from the hydraulic space are variably throttled by the armature.

* * * * *